United States Patent
Nigo et al.

(10) Patent No.: US 9,800,105 B2
(45) Date of Patent: Oct. 24, 2017

(54) PERMANENT MAGNET EMBEDDED MOTOR, COMPRESSOR, AND REFRIGERATION AND AIR CONDITIONING DEVICE

(71) Applicants: Masahiro Nigo, Tokyo (JP); Naohiro Oketani, Tokyo (JP); Koji Yabe, Tokyo (JP); Kazuhiko Baba, Tokyo (JP)

(72) Inventors: Masahiro Nigo, Tokyo (JP); Naohiro Oketani, Tokyo (JP); Koji Yabe, Tokyo (JP); Kazuhiko Baba, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 124 days.

(21) Appl. No.: 14/434,828

(22) PCT Filed: Nov. 1, 2012

(86) PCT No.: PCT/JP2012/078350
§ 371 (c)(1),
(2) Date: Apr. 10, 2015

(87) PCT Pub. No.: WO2014/068753
PCT Pub. Date: May 8, 2014

(65) Prior Publication Data
US 2015/0280500 A1 Oct. 1, 2015

(51) Int. Cl.
*H02K 1/27* (2006.01)
*H02K 21/16* (2006.01)
*F25B 31/02* (2006.01)

(52) U.S. Cl.
CPC ............. *H02K 1/276* (2013.01); *F25B 31/02* (2013.01); *H02K 21/16* (2013.01)

(58) Field of Classification Search
CPC ...... H02K 1/276; H02K 21/16; H02K 1/2766; H02K 1/2773; F25B 31/02
(Continued)

(56) References Cited

U.S. PATENT DOCUMENTS 5,936,323 A * 8/1999 Shibukawa ............ H02K 1/276
310/152
7,365,466 B2 * 4/2008 Weihrauch ............. H02K 1/276
310/156.78
(Continued)

FOREIGN PATENT DOCUMENTS

CN 100502201 C 6/2009
DE 10 2008 041 555 A1 3/2010
(Continued)

OTHER PUBLICATIONS

JP 2006211801 A—Machine Translation.*
(Continued)

*Primary Examiner* — Burton Mullins
(74) *Attorney, Agent, or Firm* — Posz Law Group, PLC

(57) ABSTRACT

A rotor core includes a plurality of first electromagnetic steel plates that are stacked in an axial direction and a plurality of second electromagnetic steel plates that are stacked in an axial direction at both ends of the electromagnetic steel plate group thereof. The first electromagnetic steel plates are provided therein with magnet insertion holes and first flux barriers. The second electromagnetic steel plates are provided therein with the magnet insertion holes, second flux barriers, and projections that regulate the positions of the magnets. The second electromagnetic steel plates are stacked at at least one of the axial direction ends of the electromagnetic steel plate group including the plurality of first electromagnetic steel plates and are provided at a position overhanging the axial direction end of a stator core.

14 Claims, 10 Drawing Sheets

(58) Field of Classification Search
USPC .................................................. 310/156.53
See application file for complete search history.

(56) References Cited

U.S. PATENT DOCUMENTS

2002/0175584 A1* 11/2002 Koharagi ............ H02K 1/2766
                                                    310/156.56
2009/0066181 A1    3/2009 Abel et al.

FOREIGN PATENT DOCUMENTS

| EP | 1 855 370 | A1 |   | 11/2007 |
|----|-----------|----|----|---------|
| JP | 2001-037122 | A |   | 2/2001 |
| JP | 2001-258187 | A |   | 9/2001 |
| JP | 2001-352702 | A |   | 12/2001 |
| JP | 2003-143788 | A |   | 5/2003 |
| JP | 2004-289904 | A |   | 10/2004 |
| JP | 2006211801 | A | * | 8/2006 |
| JP | 2006-238678 | A |   | 9/2006 |
| JP | 2006-314196 | A |   | 11/2006 |
| JP | 2007-014199 | A |   | 1/2007 |
| JP | 2007-181254 | A |   | 7/2007 |
| JP | 4005988 | B2 |   | 8/2007 |
| JP | 2009-247131 | A |   | 10/2009 |
| JP | 2000-287423 | A |   | 10/2010 |
| JP | 2011-199944 | A |   | 10/2011 |
| JP | 2011-259610 | A |   | 12/2011 |
| JP | 2012-039746 | A |   | 2/2012 |
| JP | 2012-210040 | A |   | 10/2012 |
| JP | WO 2012132331 | A1 | * | 10/2012 ............ H02K 1/276 |
| JP | 2012-217320 | A |   | 11/2012 |

OTHER PUBLICATIONS

Chinese Office Action mailed date Sep. 5, 2016 in the corresponding CN application No. 201280076722.4(Partial English translation attached).

International Search Report of the International Searching Authority mailed Jan. 15, 2013 for the corresponding international application No. PCT/JP2012/078350 (and English translation).

* cited by examiner

PERMANENT MAGNET EMBEDDED MOTOR, COMPRESSOR, AND REFRIGERATION AND AIR CONDITIONING DEVICE

CROSS REFERENCE TO RELATED APPLICATION

This application is a U.S. national stage application of International Patent Application No. PCT/JP2012/078350 filed on Nov. 1, 2012, the disclosure of which is incorporated herein by reference.

TECHNICAL FIELD

The present invention relates to a permanent magnet embedded motor, a compressor, and a refrigeration and air conditioning device.

BACKGROUND

Motors that are incorporated in the compressors of refrigeration and air conditioning devices are required to be energy saving, low-noise emitting, and guaranteed to operate in a high temperature atmosphere of approximately 150° C. Generally, the residual magnetic flux density in a rare-earth magnet that contains Nd—Fe—B is high, and thus rare-earth magnets are suitable for downsized and high-efficiency motors; however, as the temperature increases, a rare-earth magnet's coercive force is reduced. Therefore, when a plurality of motors that include rare-earth magnets and are operated with the same current are used in a high temperature atmosphere, the individual motors tend to become demagnetized. One method for solving this problem is to add a heavy rare-earth element such as Dy (dysprosium) or Tb (terbium) to rare-earth magnets used in a high temperature atmosphere. With this method, the coercive force is improved and the motors resist demagnetization. However, in recent years, the value of heavy rare-earth elements has increased due to their scarcity, and the risks associated with procurement and price hikes are increasing. Due to such problems, there has been a demand for a high-efficiency, low-noise motor that can be used without becoming demagnetized even when it contains a rare-earth magnet that has a low coercive force.

In the conventional technique for a rotor described in Patent Literature 1 listed below, permanent magnet insertion holes are formed in a rotor core in which the plates of a plurality of electromagnetic steel plates are stacked upon each other and voids (flux barriers) to prevent magnetic flux leakage are provided on both circumferential sides of the permanent magnet insertion holes. Furthermore, projections for fixing the permanent magnet are provided on both circumferential sides of the permanent magnet insertion holes. The magnetic flux leakage is a phenomenon where, for example, a magnetic flux at a circumferential end of the permanent magnet leaks to adjacent permanent magnets via an electromagnetic steel plate between magnetic poles; or the magnetic flux is short-circuited in the magnet itself. Therefore, in this conventional rotor, positioning of the permanent magnet is performed and the magnetic flux leakage is reduced, thereby providing a high-efficiency motor.

Furthermore, this conventional rotor is made by combining an electromagnetic steel plate having the projections described above and an electromagnetic steel plate having no such projections. When compared to an electromagnetic steel plate having no projections, in the electromagnetic steel plate having projections, the distance between the surface and the rear surface of a magnet becomes shorter, and thus the magnetic flux tends to be short-circuited in the magnet itself as much as in the projections provided. With this configuration, the permanent magnets can be positioned when inserted into the permanent magnet insertion holes, and by reducing the area of the electromagnetic steel plate having projections, it is possible to provide a high-efficiency motor in which magnetic flux leakage is reduced.

PATENT LITERATURE

Patent Literature 1: Japanese Patent Application Laid-open No. 2007-181254

In a permanent magnet motor, for example, when the load is large, when the motor is in a locked state during an operation due to an overload, when the motor is in a transient state when it is started and the like, or when a stator wiring is short-circuited, there is a case where a large armature reaction occurs and a reverse magnetic field is applied to the rotor. Particularly, in the case of a concentration winding type rotor, adjacent teeth are instantaneously caused to become different poles in which the inductance becomes large, and a reverse magnetic field tends to be applied to the rotor. The reverse magnetic field is a magnetic field of a pole that is opposite to the direction of the pole that is induced in the rotor when the stator is energized.

As the conventional rotor described in Patent Literature 1 described above, when electromagnetic steel plates having projections for fixing permanent magnets and electromagnetic steel plates having no such projections are combined, a magnetic flux of demagnetization due to the reverse magnetic field avoids flux barriers having a large magnetic resistance and thus tends to pass through the projections, which are magnetic paths having smaller magnetic resistances. Accordingly, there has been a problem in that the magnetic flux due to the demagnetization is concentrated on an area where these projections are provided; and thus local partial demagnetization tends to occur at, for example, the parts of the permanent magnets adjacent to these projections.

SUMMARY

The present invention has been achieved in view of the above problems, and an objective of the present invention is to provide a permanent magnet embedded motor, a compressor, and a refrigeration and air conditioning device that are capable of reducing demagnetization of permanent magnets that are embedded in a rotor, thus achieving further improvement in the reliability of the motor.

In order to solve the problem described above and achieve the objective, one aspect of the present invention relates to a permanent magnet embedded motor that includes a rotor core including a plurality of electromagnetic steel plates that are stacked therein. The rotor core is provided in a stator core. The rotor core includes a plurality of first electromagnetic steel plates that are stacked in an axial direction, and a plurality of second electromagnetic steel plates. The first electromagnetic steel plates are provided with a plurality of magnet insertion holes that are made therein for inserting magnets therethrough constituting magnetic poles of the rotor core, and are provided with first voids that are formed at both circumferential ends of the magnet insertion holes. The second electromagnetic steel plates are provided with the magnet insertion holes, second voids that are formed at both circumferential ends of the magnet insertion holes, and projections that are formed at both circumferential ends of a radially inside surface of the magnet insertion holes so as to regulate a position of the magnets. The second electromagnetic steel plates are stacked at at least one of axial direction ends of an electromagnetic steel plate group including the plurality of first electromagnetic steel plates, and are provided at a position overhanging an axial direction end of the stator core.

According to the present invention, a second electromagnetic steel plate having projections is provided at a position overhanging in an axial direction at the end of a stator core, thus making it difficult for the magnetic flux of demagnetization generated in the stator core to flow through the second electromagnetic steel plate; therefore demagnetization of permanent magnets that are embedded in a rotor can be reduced; and further improvement in the reliability of the motor can be achieved.

DETAILED DESCRIPTION

Embodiments of a permanent magnet embedded motor, a compressor, and a refrigeration and air conditioning device according to the present invention will be described below in detail with reference to the accompanying drawings. The present invention is not limited to the embodiments.

Embodiment

Figure 1:
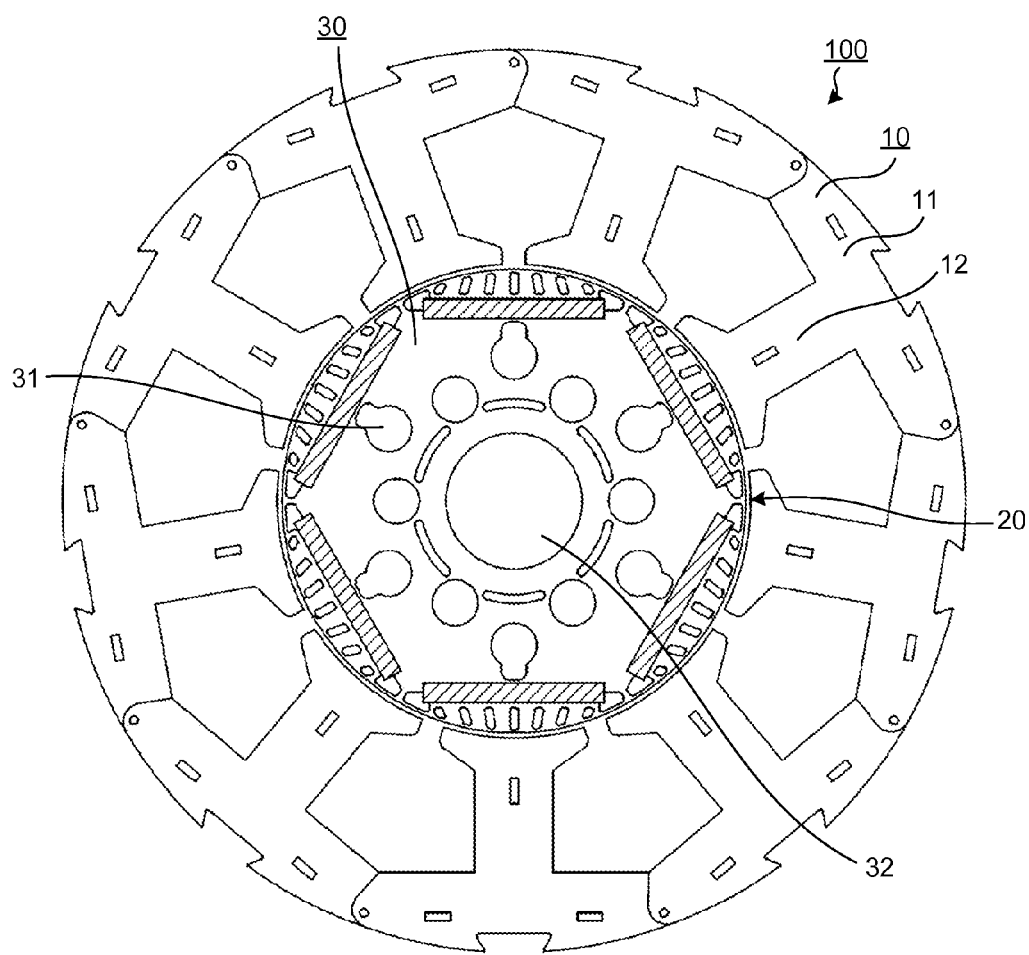
FIG. 1 is a cross-sectional view illustrating a permanent magnet embedded motor according to an embodiment of the present invention.
Figure 2:
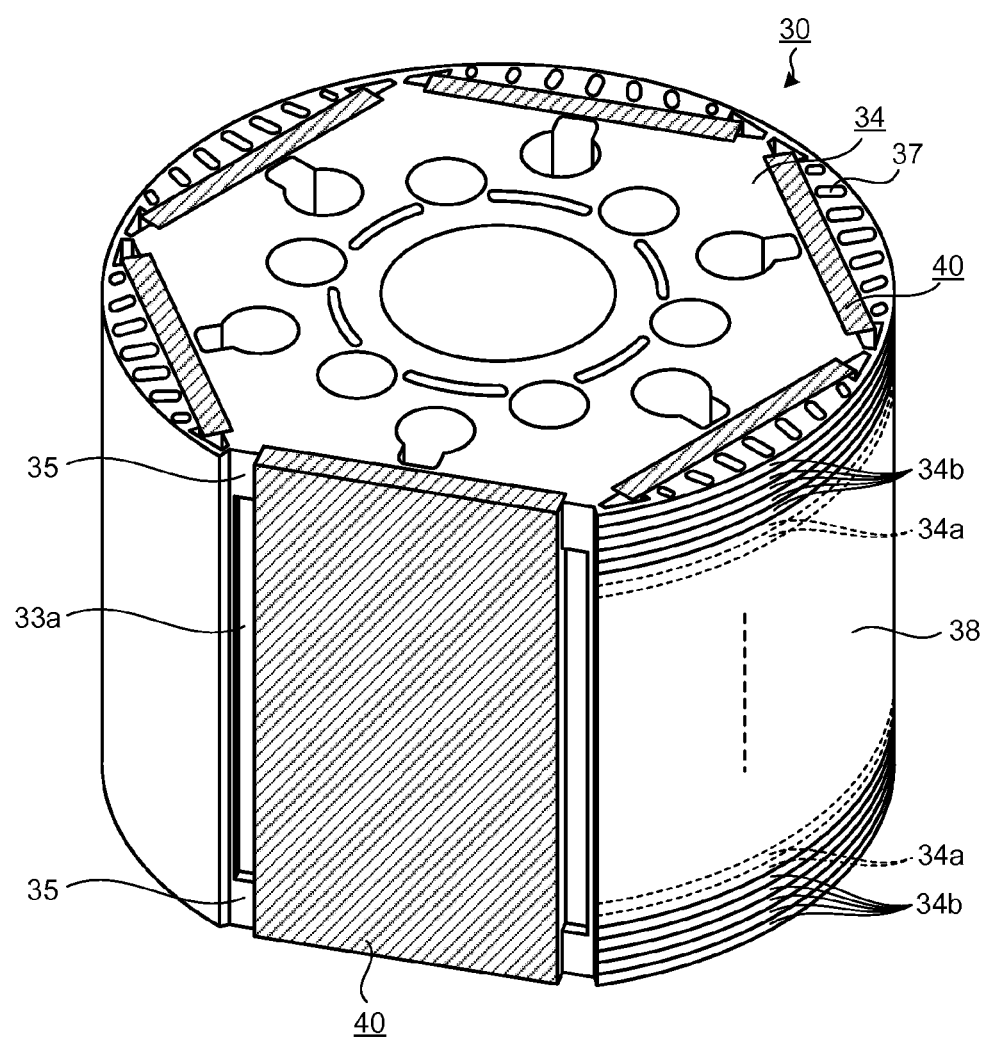
FIG. 2 is a perspective view illustrating the rotor illustrated in FIG. 1.
Figure 3:
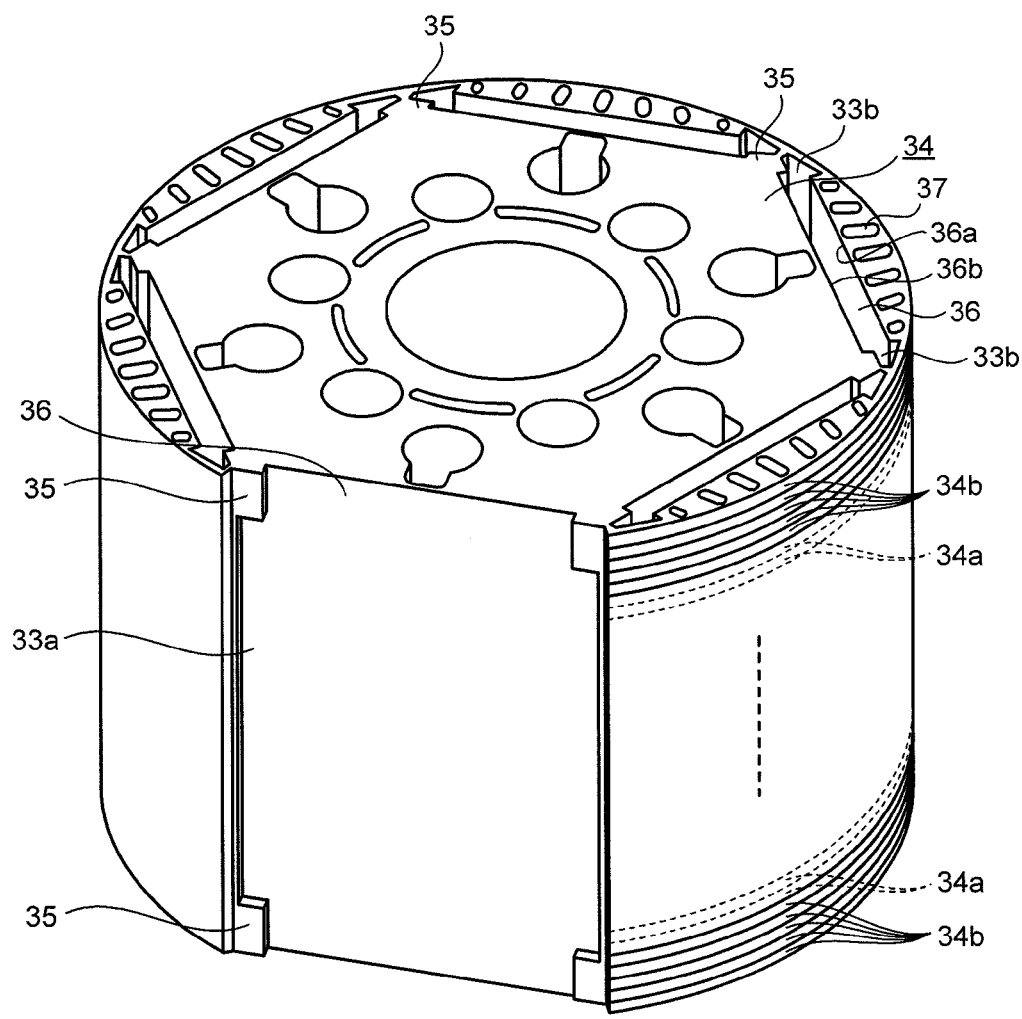
FIG. 3 is a perspective view illustrating the rotor core.
Figure 4:
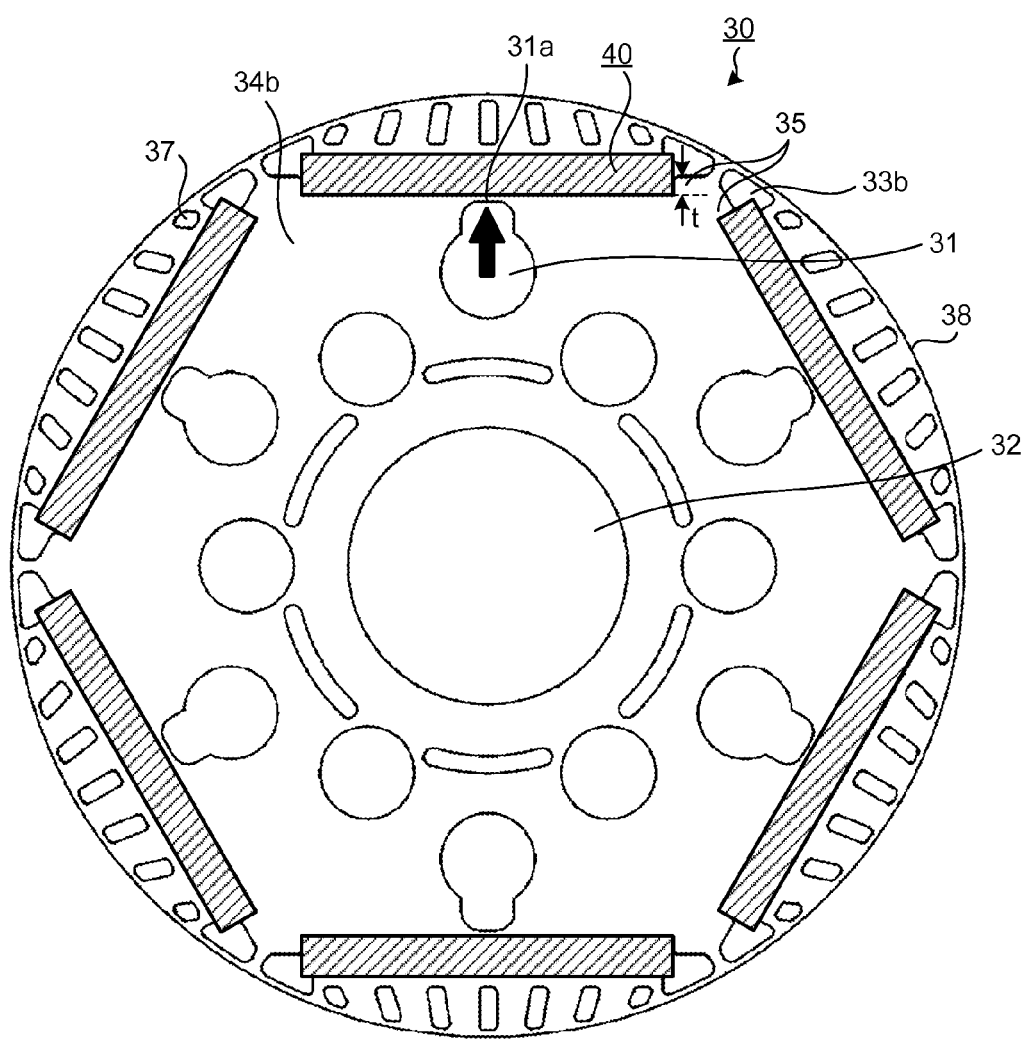
FIG. 4 is a cross-sectional view illustrating the rotor in which a second electromagnetic steel plate is viewed in a planar manner.
Figure 5:
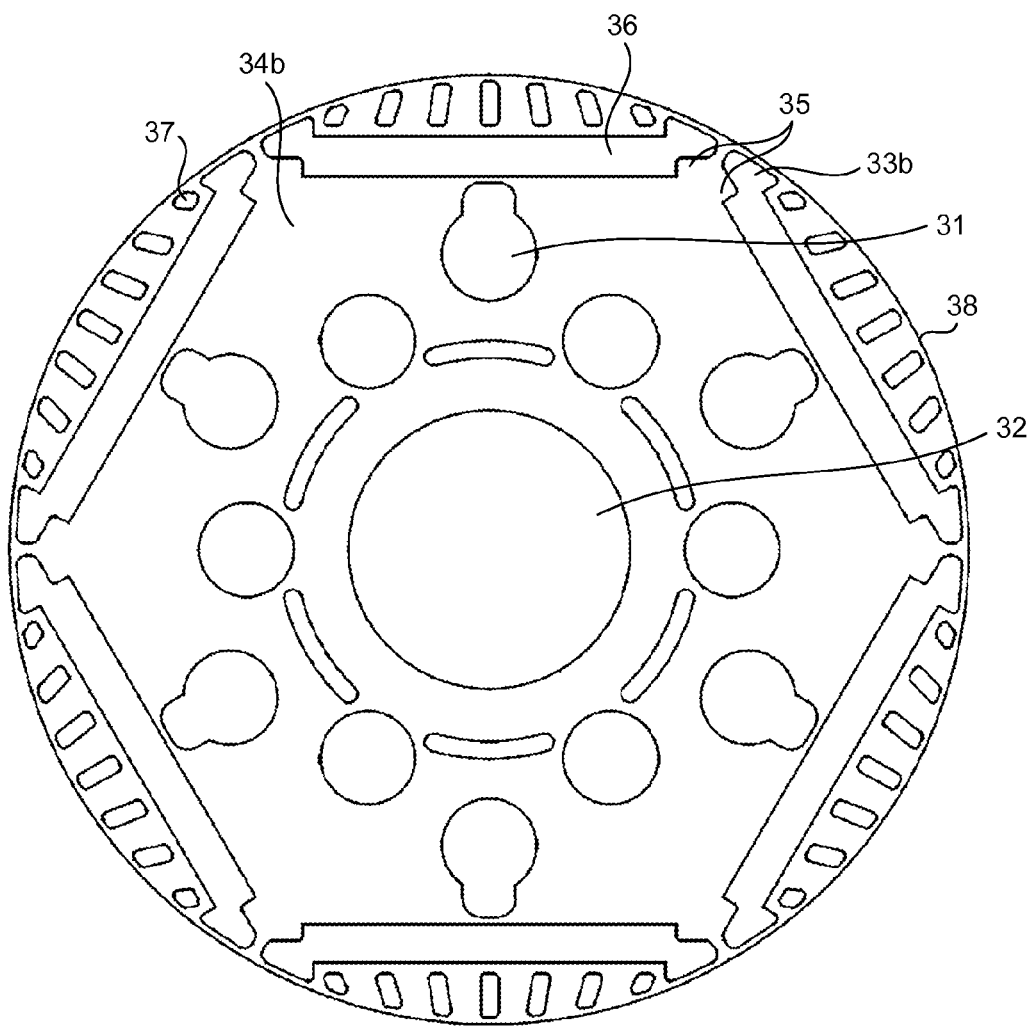
FIG. 5 is a cross-sectional view illustrating a rotor core in which the second electromagnetic steel plate is viewed in a planar manner.
Figure 6:
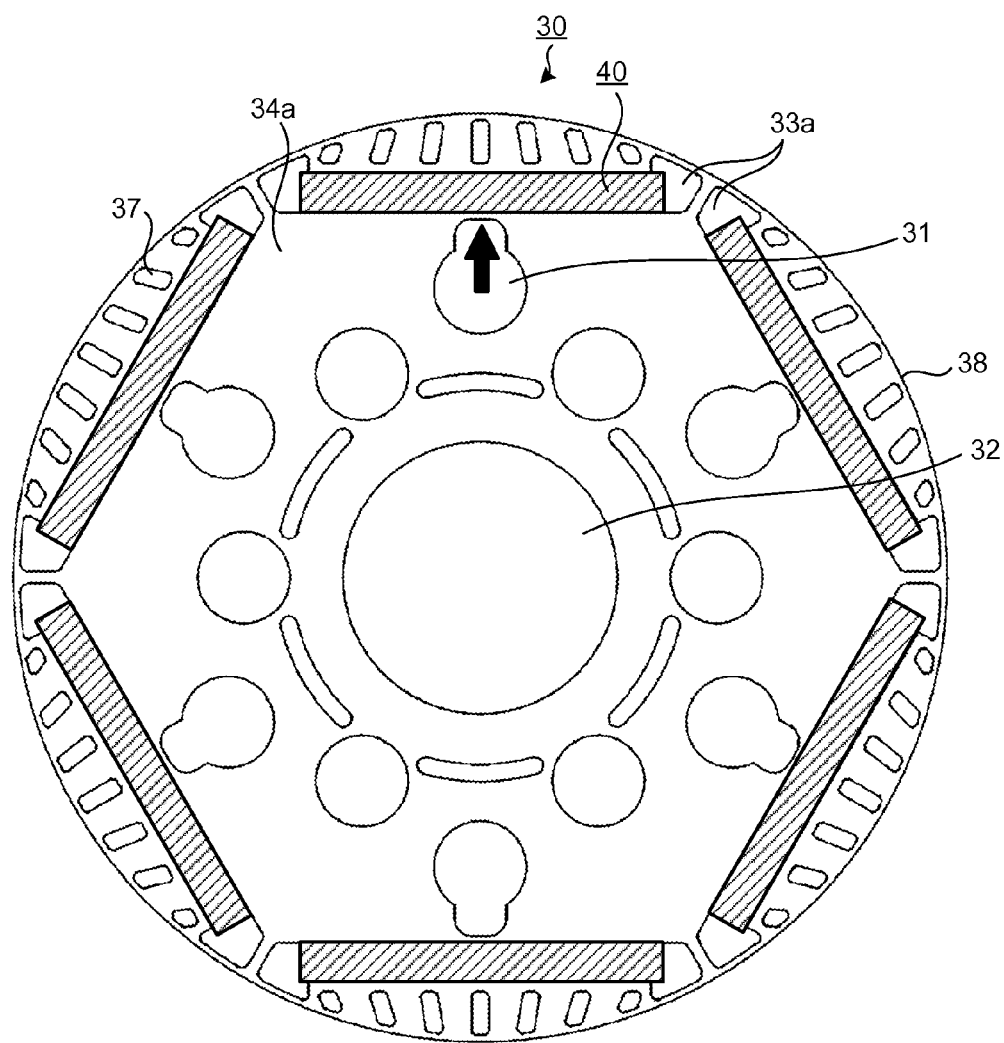
FIG. 6 is a cross-sectional view illustrating the rotor in which a first electromagnetic steel plate is viewed in a planar manner.
Figure 7:
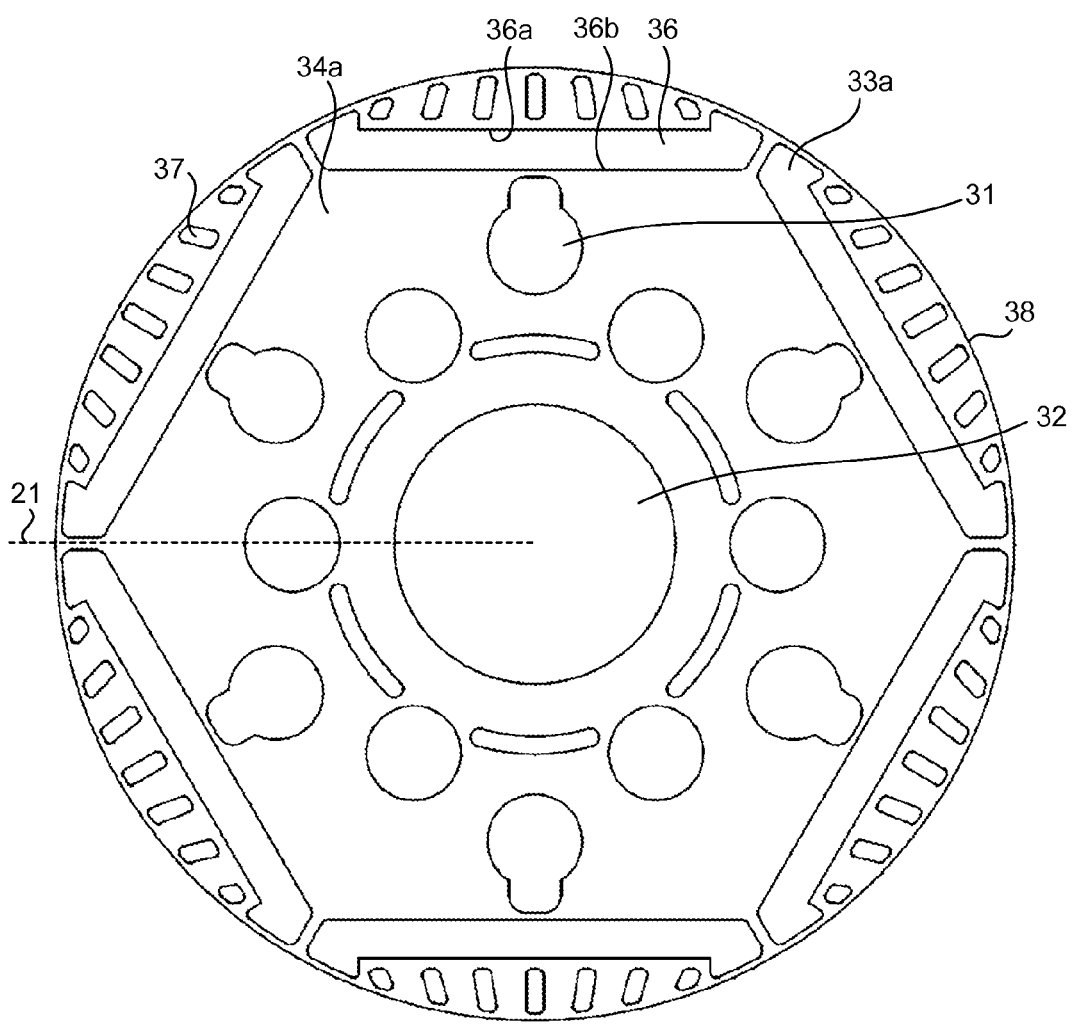
FIG. 7 is a cross-sectional view illustrating the rotor core in which the first electromagnetic steel plate is viewed in a planar manner.
Figure 8:
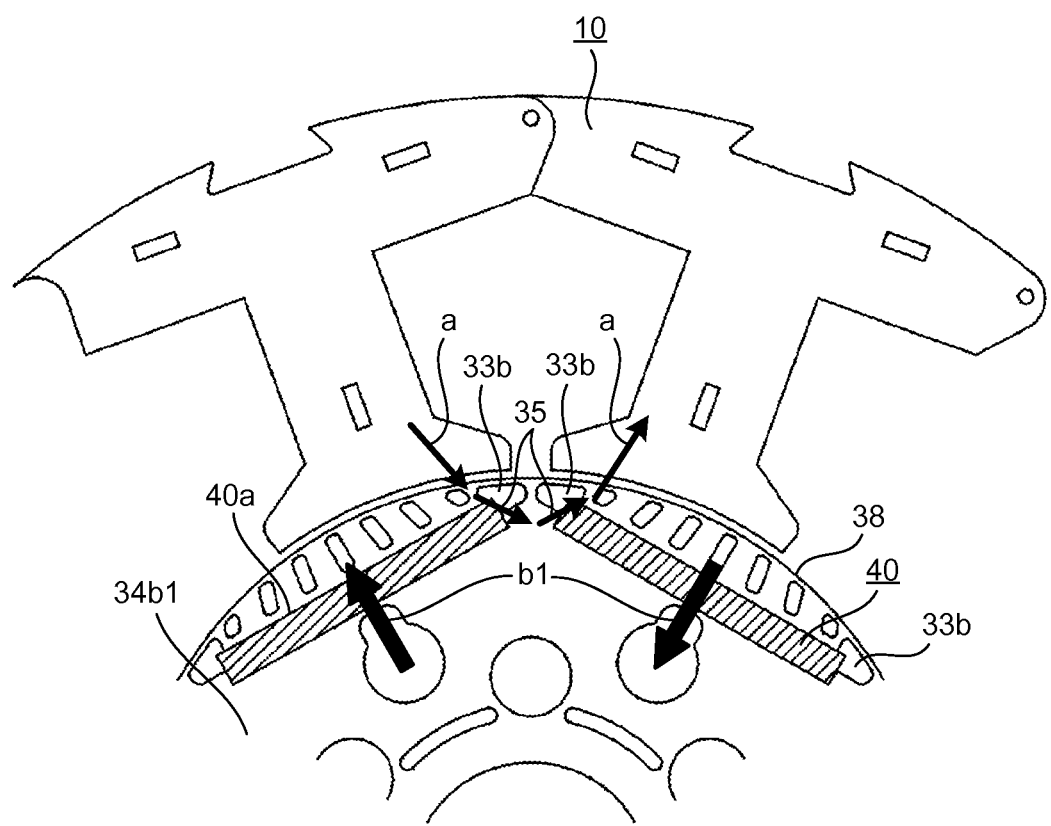
FIG. 8 is a cross-sectional view illustrating relevant parts of the rotor.
Figure 9:
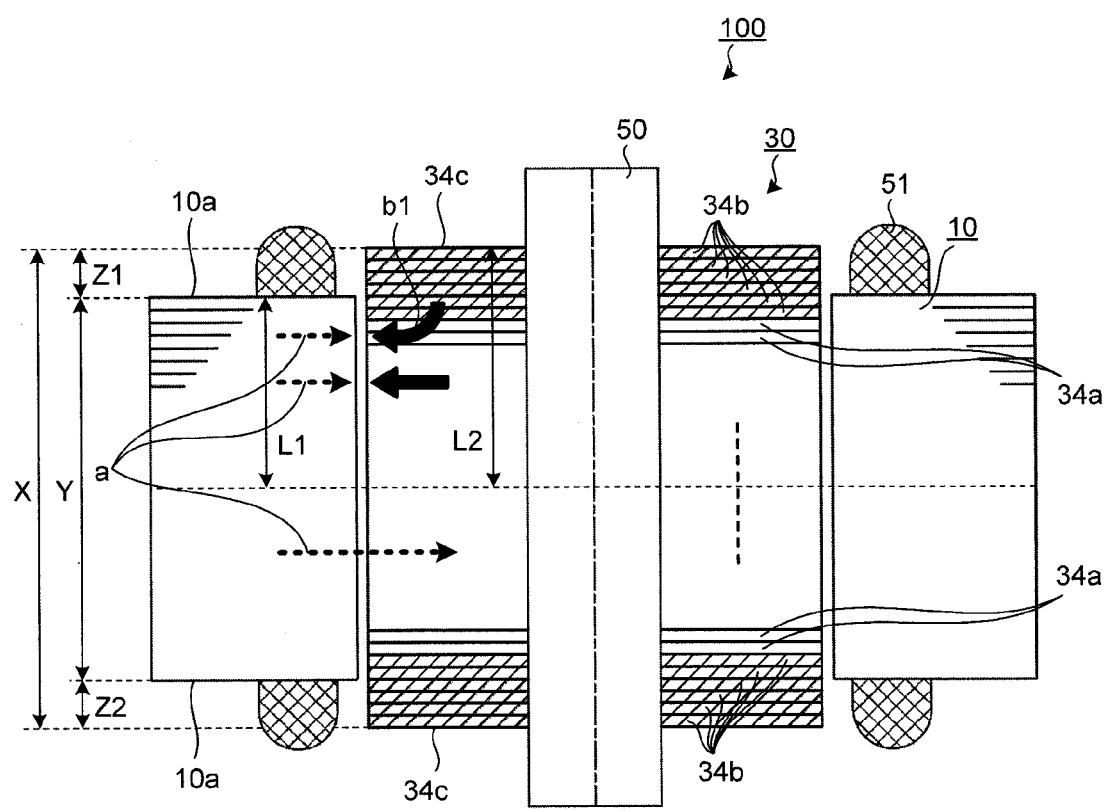
FIG. 9 is a side view illustrating the motor for the purpose of describing the flow of magnetic flux.
Figure 10:
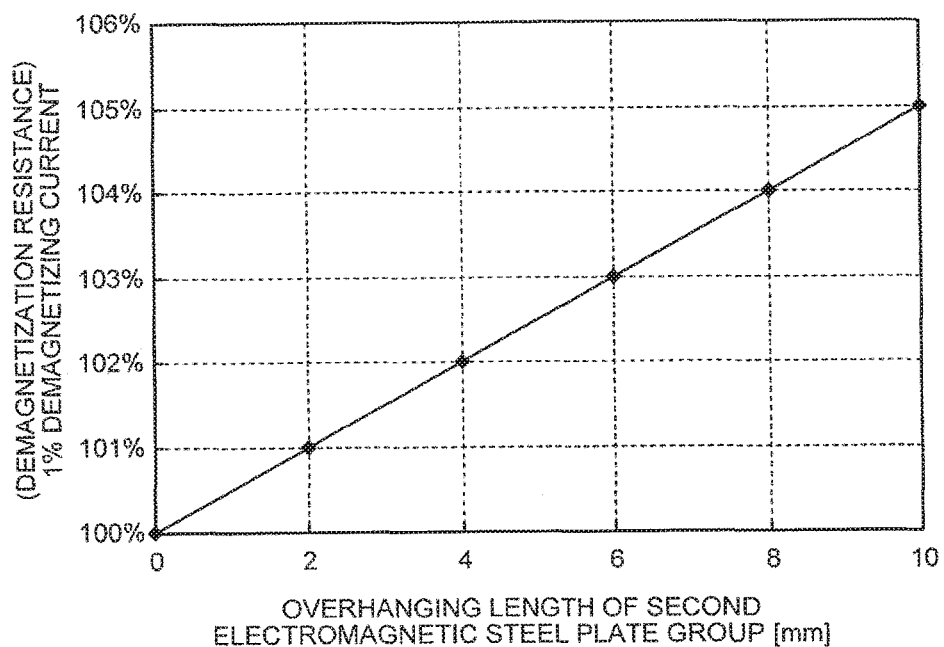
FIG. 10 is a graph illustrating the relation between overhang length and the demagnetization resistance of the second electromagnetic steel plate with respect to the stator core.
Figure 11:
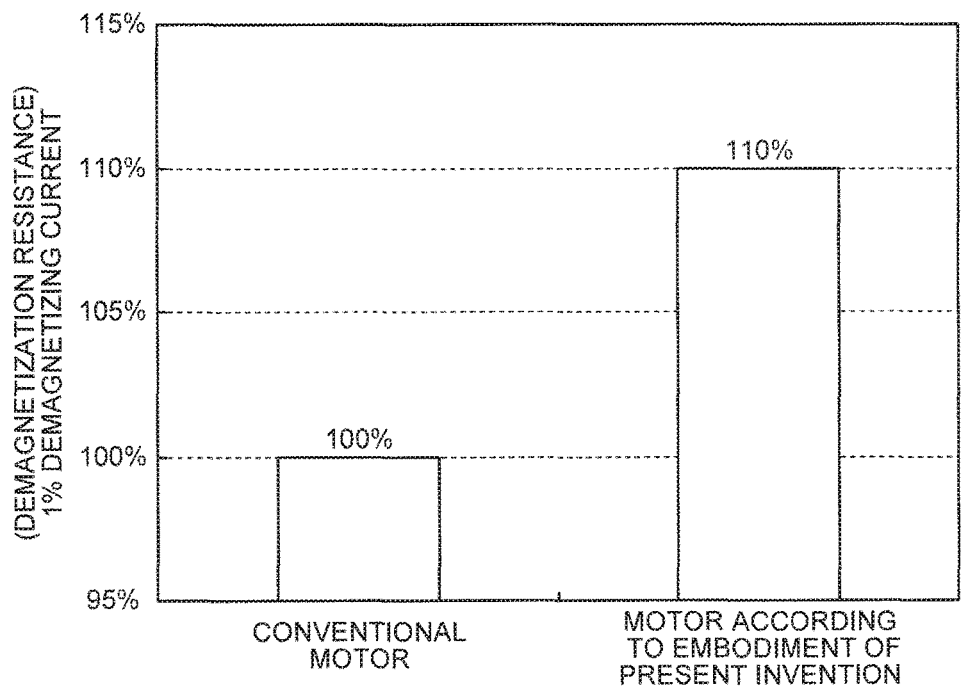
FIG. 11 is a view illustrating the demagnetization resistance of a conventional motor and that of the motor according to the embodiment of the present invention.

FIG. 1 is a cross-sectional view illustrating a permanent magnet embedded motor (hereinafter, "motor") 100 according to an embodiment of the present invention. FIG. 2 is a perspective view illustrating a rotor 30 illustrated in FIG. 1. FIG. 3 is a perspective view illustrating a rotor core 34. FIG. 4 is a cross-sectional view illustrating the rotor 30 in which a second electromagnetic steel plate 34b is viewed in a planar manner. FIG. 5 is a cross-sectional view illustrating the rotor core 34 in which the second electromagnetic steel plate 34b is viewed in a planar manner. FIG. 6 is a cross-sectional view illustrating the rotor 30 in which a first electromagnetic steel plate 34a is viewed in a planar manner. FIG. 7 is a cross-sectional view illustrating the rotor core 34 in which the first electromagnetic steel plate 34a is viewed in a planar manner. FIG. 8 is a cross-sectional view illustrating relevant parts of the rotor 30. FIG. 9 is a side view illustrating the motor 100 for the purpose of describing the flow of magnetic flux. FIG. 10 is a view illustrating the relation between overhang length and the demagnetization resistance of the second electromagnetic steel plate 34b with respect to a stator core 10. FIG. 11 is a view illustrating a demagnetization resistance of a conventional motor and that of the motor 100 according to the embodiment of the present invention.

In FIG. 1, the motor 100 is configured to include the stator core 10 and the rotor 30. The stator core 10 is configured by stacking, in an axial direction, a plurality of layers, each of which is an electromagnetic steel plate having a thickness of, for example, approximately 0.35 millimeters and each of which is punched with a die. The stator core 10 is configured to include a yoke part 11 and a plurality of teeth parts 12, each extending in a radially inner direction from the yoke part 11 and each is provided at an equal interval in a circumferential direction.

Wiring 51 (see FIG. 9) is wound around the teeth part 12. In the motor 100, a current with a frequency that is synchronized with the rotational command frequency starts to flow in the stator core 10 so as to generate a rotating magnetic field; and the rotor 30 is rotated by the rotating magnetic field. On the inner circumferential side of the stator core 10, the rotor 30 is provided via an air gap 20.

The rotor 30 illustrated in FIG. 2 is configured to include the rotor core 34 and permanent magnets 40 as main constituent elements. Note that in FIG. 2, in order to clarify the relation between projections 35 described later and the permanent magnets 40, part of the core on the radially outside of the permanent magnets 40 illustrated at the front side of FIG. 2 is omitted. The permanent magnet is, for example, a rare-earth magnet including Nd—Fe—B and is formed as a flat plate shape having a thickness of approximately 2 millimeters. Note that the permanent magnets 40 are not limited to this example.

The rotor core 34 is configured from a plurality of first electromagnetic steel plates 34a (a first electromagnetic steel plate group) that are stacked in an axial direction and a plurality of second electromagnetic steel plates 34b (a second electromagnetic steel plate group) that are stacked in an axial direction at both ends of the first electromagnetic steel plate group. The second electromagnetic steel plate 34b and the first electromagnetic steel plate 34a are punched out of an electromagnetic steel plate having a thickness of, for example, approximately 0.35 millimeters with a die.

In a central portion of the rotor core 34, an insertion hole (a shaft hole 32) of a shaft 50 (see FIG. 9) for transferring rotational energy is provided. The shaft hole 32 and the shaft 50 are connected by a shrink-fit, a press-fit, and the like. As illustrated in FIG. 3, in the rotor core 34, magnet insertion holes 36 formed in equal number to the number of poles in a circumferential direction are provided at the same intervals in the same circumference. The magnet insertion holes 36 have substantially the same shape as that of the permanent magnet 40. Between a rotor outer circumferential surface 38 and the shaft hole 32, the magnet insertion holes 36 are provided near to the rotor outer circumferential surface 38. In the magnet insertion holes 36, adjacent permanent magnets 40 are inserted so as to mutually have a reversed polarity in the radial direction. Each of the magnetic poles is formed by this process. It is satisfactory if the number of magnetic poles of the rotor 30 is two or more. In the present embodiment, as an example, a configuration example of the rotor 30 is described where the number of magnetic poles is six.

In the core part between a radially outside surface 36a of the magnet insertion hole 36 and the rotor outer circumferential surface 38, a plurality of slits 37 are provided. These slits 37 suppress the reaction magnetic flux in the armature due to the stator core 10 and reduce sound vibrations. In the rotor core 34, between the magnet insertion holes 36 and the shaft hole 32, a plurality of air holes 31, each of which is a void and serves as a flow path for the coolant, is provided. The rotor core 34 is provided near to a radially inside surface 36b of the magnet insertion holes 36. The second electromagnetic steel plate 34b and the first electromagnetic steel plate 34a are formed such that these slits 37 and air holes 31 have the same shape.

FIG. 4 illustrates the second electromagnetic steel plate 34b in which the permanent magnets 40 are inserted into the magnet insertion holes 36. FIG. 5 illustrates the second electromagnetic steel plate 34b in which the permanent magnets 40 are not inserted into the magnet insertion holes 36. The second electromagnetic steel plate 34b is provided with the magnet insertion holes 36, second flux barriers 33b serving as voids for preventing magnetic fluxes from being short-circuited, and the projections 35 for fixing magnets. The projections 35 are provided at both circumferential ends of the radially inside surface 36b of the magnet insertion holes 36, so as to project from the radially inside surface 36b to a radially outer direction. The second flux barriers 33b are provided on both circumferential sides of the magnet insertion holes 36.

FIG. 6 illustrates the first electromagnetic steel plate 34a in which the permanent magnets 40 are inserted into the magnet insertion holes 36. FIG. 7 illustrates the first electromagnetic steel plate 34a in which the permanent magnets 40 are not inserted into the magnet insertion holes 36. The first electromagnetic steel plate 34a is provided with the magnet insertion holes 36 and first flux barriers 33a serving as voids for preventing magnetic fluxes from being short-circuited. The first flux barriers 33a are provided on both circumferential sides of the magnet insertion holes 36. In the first electromagnetic steel plates 34a, the projections 35 of the second electromagnetic steel plates 34b are not provided; and the radially inside surface 36b of the magnet insertion holes 36 extends linearly to the vicinity between poles 21.

As described above, while the projections 35 are provided in the second electromagnetic steel plates 34b, these projections 35 are not provided in the first electromagnetic steel plates 34a. Note that, in the rotor 30 according to the present embodiment, due to the projections 35 being provided in the second electromagnetic steel plates 34b, the permanent magnets 40 are positioned in the center of a magnetic pole, and the permanent magnets 40 can be held so as not to move when the motor 100 is being driven. Note that, due to the projections 35 being provided, the projections 35 become the shortest magnetic path to the magnet insertion holes 36; and thus magnet fluxes (magnetic fluxes between the adjacent permanent magnets 40) tend to be short-circuited. Therefore, it is preferable that the height (a thickness t of the projection 35 illustrated in FIG. 4) of the projection 35 is formed to be as small as possible (for example, approximately 1 millimeter) but still within a size that enables the permanent magnets 40 to be held.

Because magnetic fluxes tend to be short-circuited between adjacent permanent magnets 40, the rotor 30 is designed such that the magnetic paths are narrowed by the flux barriers (33a and 33b). The size in the radial direction of the flux barriers is, for example, substantially the same as that of an electromagnetic steel plate (approximately 0.35 millimeters). Due to this configuration, magnetic fluxes at the end of the permanent magnets 40 are prevented from being short-circuited; the magnetic fluxes can easily move towards the stator core 10 (see FIG. 1); and the generated torque can be increased.

When the rotor 30 is made, it is satisfactory if a cutting tool with the shape of the magnet insertion hole 36 having the projections 35 and a cutting tool with the shape of the magnet insertion hole 36 having no projections 35 are exchanged and then press machining performed.

In FIG. 9, an axial length of the rotor core 34 is set as a rotor thickness X, an axial length of the stator core 10 is set as a stator thickness Y, a length from an axial center of the stator core 10 to an axial direction end 10a is set as a length L1, a length from an axial center of the rotor core 34 to the axial direction end 34c is set as a length L2, and a difference between the rotor thickness X and the stator thickness Y is set as an overhang length Z (Z=Z1+Z2).

Here, the rotor thickness X is a size obtained by adding the second electromagnetic steel plate group to the first electromagnetic steel plate group; and the rotor thickness X is formed to be larger than the stator thickness Y. For example, the motor 100 according to the present embodiment is formed such that the stator thickness Y is 40 millimeters and the rotor thickness X is 50 millimeters. Furthermore, the first electromagnetic steel plate group is formed such that the thickness thereof is a value smaller than the stator thickness Y. Further, the second electromagnetic steel plate group provided at both ends of the first electromagnetic steel plate group is formed such that the thickness thereof is larger than, for example, the overhang length Z. That is, a part of the second electromagnetic steel plate group (approximately a few second electromagnetic steel plates 34b) is provided at a position opposing the stator core 10.

Both axial centers of the stator core 10 and the rotor 30 are provided so as to substantially match each other; the first electromagnetic steel plate group is provided at a position opposing the stator core 10; and part of the second electromagnetic steel plates 34b is provided at a position overhanging the axial direction end 10a of the stator core 10. Accordingly, the overhang length Z is 10 millimeters, and the rotor protrudes at both axial direction ends by 5 millimeters with respect to the stator. The amount of protrusion of the rotor from the stator can be asymmetric at both the axial direction ends. The permanent magnets 40 inserted into the magnet insertion hole 36 are formed such that the axial length thereof is the same as that of the rotor thickness X.

In this case, in the rotor 30, it is necessary to ensure the permanent magnets 40 are held with sufficient strength against the centrifugal force of the permanent magnets 40 generated by rotations of the rotor 30 or vibrations of the permanent magnets 40 due to the electromagnetic force due to the permanent magnets 40. Therefore, when the holding strength is insufficient, it is necessary to increase the axial thickness of the second electromagnetic steel plate group.

In the rotor 30, from the viewpoint of demagnetization, it is preferable that the ratio of the second electromagnetic steel plate group to the rotor 30 is small. This point is specifically described below. FIG. 8 illustrates a cross-section surface of a conventional motor. In a rotor of this motor, a second electromagnetic steel plate 34b1 in which the second flux barriers 33b and the projections 35 are formed is provided at a position opposing to the stator core 10. That is, the projections 35 are formed at a position opposing the stator core 10. In the rotor, the distance from a radially outside surface 40a of the permanent magnet 40 to the projection 35 is narrower than the thickness of the permanent magnet 40. Accordingly, magnetic fluxes "a" of demagnetization, having avoided the second flux barriers 33b with a larger magnetic resistance, tend to flow into the projections 35 with a reduced magnetic resistance. As a result, a part of the permanent magnets 40 adjacent to the projections 35 is demagnetized, and partial demagnetization occurs locally.

The permanent magnet 40, until a reverse magnetic field reaches a certain threshold, maintains its original magnetic characteristics; but when the reverse magnetic field exceeds this threshold, the residual magnetic flux density is reduced and the permanent magnet 40 does not return to the original magnetic characteristic. When the irreversible demagnetization occurs, the residual magnetic flux density of the permanent magnet 40 is reduced and a current for generating torque increases; and further, not only efficiency of the motor is degraded, but also controllability of the motor is degraded and, therefore, the reliability is reduced. Such problems are solved by omitting the projections 35 from the magnet insertion hole 36; however, when the projections 35 are not provided, it becomes difficult to provide the permanent magnet 40 at the center of a magnetic pole. i.e., when the permanent magnet 40 is displaced in the horizontal direction to the magnetic pole, the magnetic flux density distributions on the rotor surface become asymmetric with respect to the corresponding pole, and noise vibrations occur or the efficiency is reduced. Furthermore, as an electromagnetic force impacts on the permanent magnet when the motor 100 is driven, the permanent magnet 40 sometimes breaks due to its movement or the permanent magnet 40 becomes a source of generated noise vibrations.

The conventional rotor described in Patent Literature 1 above has been made by combining an electromagnetic steel plate having the projections 35 described above and an electromagnetic steel plate having no projections 35. With this configuration, the permanent magnet can be positioned such that the effect of leaking magnetic flux due to the projections 35 can be reduced. However, when the axial thickness of the second electromagnetic steel plate group is increased to maintain the holding strength described above, the magnetic fluxes of demagnetization intensively flow into the projections 35 with a little magnetic resistance, and partial demagnetization occurs in the permanent magnet 40 adjacent to the projections 35.

In the motor 100 according to the present embodiment, as illustrated in FIG. 9, the first electromagnetic steel plate group, which is hardly demagnetized because the plates have no projections 35, is provided at a position opposing the stator core 10; and the second electromagnetic steel plates 34b that tend to be demagnetized because of having the projections 35 are provided at a position overhanging the axial direction end 10a of the stator core 10. Because the second electromagnetic steel plate group is a magnet-embedded electromagnetic steel plate group, magnetic fluxes b1 of the permanent magnet 40 provided in the second electromagnetic steel plate group pass through the core part of the side of the rotor outer circumferential surface 38 and are interlinked with the stator core 10 while curving in the radial direction. The present embodiment is an example configured to obtain the maximum effects of the present invention, and the present embodiment is not limited to this example. For example, in order to improve magnet insertion properties, even when several pieces of the second electromagnetic steel plates 34b are provided at a position opposing to the stator core 10 in a range where the effects of demagnetization are small, the effects can still be obtained to some extent. Furthermore, in the present embodiment, while the second electromagnetic steel plate group is provided at both axial direction ends of the first electromagnetic steel plate group, the present embodiment is not limited to this configuration. For example, even in a case configured such that the second electromagnetic steel plate group is provided at only one of the axial direction ends of the first electromagnetic steel plate group, the effects can still be obtained to some extent.

Meanwhile, the magnetic fluxes "a" of demagnetization generated in the stator core 10 tend to pass through the portions having the smallest magnetic resistance; and thus the magnetic fluxes "a" hardly flow through the second electromagnetic steel plate group that overhangs and has a larger magnetic resistance. As a result, local demagnetization hardly occurs in the second electromagnetic steel plate group in which the projections 35 are provided; local demagnetization does not occur even in the first electromagnetic steel plate group in which the projections 35 are not provided; and thus the demagnetization resistance can be improved.

In the rotor 30 according to the present embodiment, the second electromagnetic steel plate group is provided at a predetermined distance from both ends of the first electromagnetic steel plate group, and thus the rotor 30 is excellent for inserting the permanent magnet 40 thereinto.

In the rotor 30 according to the present embodiment, after the positioning of the permanent magnet 40 is performed by the projections 35, a tapered stick, for example, is inserted into the air hole 31, and as this stick is moved in the direction of the arrow illustrated in FIG. 4, a thin part 31a is caused to deform in the radially outer direction, which is interposed between the radially inside surface 36b of the magnet insertion hole 36 and the air hole 31. Due to this process, the radially inside surface 36b of the magnet insertion hole 36 is pressed onto the radially inside surface of the permanent magnet 40, and the permanent magnet 40 is held by the magnet insertion hole 36. Accordingly, even if the axial thickness of the second electromagnetic steel plate group is not increased, the holding strength described above can be ensured. As a result, it is satisfactory if the projections 35 of the second electromagnetic steel plate 34b only have a positioning function in the circumferential direction of the permanent magnet 40, and in the rotor 30, the axial thickness of the second electromagnetic steel plate group can be made relatively small.

The graph of FIG. 10 illustrates, as an example, demagnetization characteristics, if it is assumed that the rotor thickness X is 50 millimeters, when the length that the second electromagnetic steel plate group overhangs the axial direction end 10a of the stator core 10 is changed from 0 millimeters to 10 millimeters. The overhang length of the second electromagnetic steel plate group for the stator core is indicated on the horizontal axis, and a demagnetization resistance is indicated on the vertical axis. For example, 0 millimeters on the horizontal axis indicates a state where all the plates in the second electromagnetic steel plate group are provided at a position opposing to the stator core 10. Further, 10 millimeters on the horizontal axis indicates a state where all plates in the second electromagnetic steel plate group are provided at a position overhanging the axial direction end 10a of the stator core 10. In FIG. 10, the demagnetization resistance is defined as follows. The demagnetization resistance is defined as the ratio of a current value in which a demagnetization current is applied (a magnetic flux of demagnetization is applied to a permanent magnet) and an induction voltage (a voltage generated in the wiring when a motor is rotated by N external power) is reduced by 1% (irreversibly demagnetized) at a temperature (for example, approximately 150° C.) that is assumed to be that of the inside of the compressor.

As illustrated in FIG. 10, as the overhang length of the second electromagnetic steel plate group increases from 0 millimeters, the demagnetization resistance is improved; and when the thickness is 10 millimeters, for example, the demagnetization resistance is improved by 5%.

When the motor 100 is demagnetized, the performance of the compressor or of the refrigeration and air conditioning device in which the motor 100 is incorporated varies or a voltage generated in the motor 100 changes; and thus the motor 100 has degraded controllability. Accordingly, in order to satisfy the reliability of products, reduction in the demagnetization factor needs to be reduced to approximately 1%. In FIG. 11, in a conventional motor, the projections 35 are formed in all the electromagnetic steel plates constituting a rotor core. When the demagnetization resistance of the conventional motor and that of the motor 100 according to the present embodiment are compared to each other, the motor 100 has an improvement of more than 10% compared with the conventional motor. Accordingly, when the motor 100 is used in the same current range as that of the conventional motor, the permanent magnet 40 that has a lower coercive force than the permanent magnet used in the conventional motor can be used, meaning, in the motor 100, the added amount of heavy rare-earth elements to improve the coercive force can be reduced; and thus cost reduction can be achieved.

The details of improvement in the demagnetization resistance is illustrated in FIG. 11 and the demagnetization resistance is improved by 5% by reducing the ratio of the electromagnetic steel plate group in which the projections 35 are provided; and the demagnetization resistance is further improved by 5% by overhanging the second electromagnetic steel plate group over the stator core 10.

The motor 100 according to the present embodiment produces the following effects, regardless of the winding system, the number of slots, and the number of poles.

(1) Because the flux barriers (33a and 33b) are provided, it is possible to provide a high-efficiency motor 100 that leaks magnetic flux less; and it is possible to provide a high-reliability motor 100 that is demagnetized less.

(2) Because the motor 100 that can be provided is resistant to demagnetization, when the demagnetization resistance of the motor 100 is the same as that of the conventional motor, a magnet having a low coercive force can be used in the motor 100, and a low-price rare-earth magnet, which is a magnet to which the amount of heavy rare-earth element added is low, can be used in the motor 100. When the added amount of the heavy rare-earth element is reduced, the magnet has improved residual magnetic flux density. Accordingly, magnetic torque is improved; the current for generating the same torque can be reduced; the copper loss can be reduced; and the inverter energization loss can be reduced.

(3) Because the motor 100 that can be provided is resistant to demagnetization, when the demagnetization resistance of the motor 100 is the same as that of the conventional motor, the thickness of the permanent magnet 40 can be thinner; the amount of expensive rare-earth magnet that it is necessary to use is reduced; and further manufacturing cost reductions can be achieved.

(4) By using the motor 100 according to the present embodiment, it is possible to provide a compressor and a refrigeration and air conditioning device, of which the magnets are demagnetized less and which features high efficiency, high reliability, and low-noise emissions.

In the rotor 30 according to the present embodiment, for example, the thin part 31a that is located in the radially outer direction of the air hole 31 is deformed so that the permanent magnet 40 is fixed in the magnet insertion hole 36. In a case where the rotor thickness X is 50 millimeters, in order that the holding strength described above is only provided by the second electromagnetic steel plate group, it requires ensuring the thickness of the second electromagnetic steel plate group to be approximately half of 50 millimeters (that is, 25 millimeters). In the rotor 30 according to the present embodiment, because the permanent magnet 40 is fixed on portions other than the projections 35, it is satisfactory if the second electromagnetic steel plates 34b have only a positioning function in the circumferential direction of the permanent magnet 40; and the thickness of the second electromagnetic steel plate group can be reduced to approximately 10 millimeters. As a result, the area of the second electromagnetic steel plate group in which the projections 35 are formed can be reduced, and the overhang length Z can be reduced.

The method of fixing the permanent magnet 40 is not limited to the method of deforming the air hole 31, and for example, it is also satisfactory if the permanent magnet 40 is adhered to an inner circumferential surface of the magnet insertion hole 36.

The values of the stator thickness Y and that of the rotor thickness X described in the present embodiment are only an example; and if only the second electromagnetic steel plates 34b are formed to overhang the axial direction end 10a of the stator core 10, the same effects as those described above can be obtained.

With the rotor 30 according to the present embodiment, all the second electromagnetic steel plates 34b constituting the second electromagnetic steel plate group preferably overhang the axial direction end 10a of the stator core 10; however, as long as at least one of the second electromagnetic steel plates overhangs the axial direction end 10a of the stator core 10, similar effects as those described above can be obtained.

In the present embodiment, the second electromagnetic steel plate group is provided at both ends of the rotor core 34; however, if the second electromagnetic steel plate group is provided at only one of the ends of the rotor core 34, similar effects as those described above can be obtained.

The motor 100 using the rotor 30 according to the present embodiment drives at variable speed under the PWM control of an inverter of a drive circuit (not illustrated) so as to be able to operate at high efficiency in accordance with required product load conditions. For example, when the motor 100 is incorporated in a compressor for an air conditioning device, it is guaranteed that it can be used in a high temperature atmosphere of 100° C. or more.

As described above, in the motor 100 according to the present embodiment, the rotor core 34 each includes the plurality of first electromagnetic steel plates 34a and the plurality of second electromagnetic steel plates 34b that are stacked in an axial direction. In the first electromagnetic steel plates 34a, a plurality of magnet insertion holes 36, which are for inserting the magnets (40) constituting a magnetic pole of the rotor core 34, and the first flux barriers (33a), which are formed at both circumferential ends of each of the magnet insertion holes 36, are formed. The second electromagnetic steel plates 34b are provide with the plurality of magnet insertion holes 36, the second flux barriers (33b) formed at both circumferential ends of the magnet insertion holes 36, and the projections 35 that are formed at both circumferential ends of each of the radially inside surface 36b of each of the magnet insertion holes 36 so as to regulate the positions of the magnets. The second electromagnetic steel plates 34b are each stacked at at least one of the axial direction ends 10a of an electromagnetic steel plate group including each of the first electromagnetic steel plates 34a and are provided at a position overhanging the axial direction end 10a of the stator core 10. Because of this configuration, it is possible to provide the motor 100 in which the magnetic fluxes "a" of demagnetization generated in the stator core 10 flow less through the second electromagnetic steel plates 34b and which is capable of reducing the demagnetization of the permanent magnets 40 embedded in the rotor 30, thereby achieving further improvement in its reliability.

Furthermore, by providing the motor 100 according to the present embodiment in a compressor and providing this compressor in a refrigeration and air conditioning device, it is possible to provide a compressor and a refrigeration and air conditioning device that are demagnetized less and which have high efficiency and reliability with low-noise emissions.

The permanent magnet embedded motor, the compressor, and the refrigeration and air conditioning device according to the embodiment of the present invention are examples indicating a part of the contents of the present invention. The above embodiments can be combined with other well-known techniques, and it is not necessary to say that the present invention can be configured while modifying it without departing from the scope of the invention, such as omitting a part of its configuration.

INDUSTRIAL APPLICABILITY

As described above, the present invention can be applied to a permanent magnet embedded motor, and is particularly useful as an invention capable of having a reduced manufacturing cost while achieving high efficiency with its motor.

The invention claimed is:

1. A permanent magnet embedded motor comprising a rotor core including a plurality of electromagnetic steel plates that are stacked therein, the rotor core being provided in a stator core and comprising:
a plurality of first electromagnetic steel plates that are stacked in an axial direction, and
a plurality of second electromagnetic steel plates, wherein
each of the first and second electromagnetic steel plates contains a plurality of magnet insertion holes having magnets inserted therethrough, the magnets constituting magnetic poles of the rotor core,
each of the first electromagnetic steel plates contains first voids provided at both circumferential ends of each of the magnet insertion holes,
each of the second electromagnetic steel plates contains:
second voids provided at both circumferential ends of each of the magnet insertion holes, and
projections provided at both circumferential ends of a radially inside surface of each of the magnet insertion holes, the projections being configured to regulate a position of the magnets,
each of the second electromagnetic steel plates is stacked on at least one of axial direction ends of an electromagnetic steel plate group including each of the first electromagnetic steel plates, and
L1 represents a length from an axial direction center of the stator core to an axial direction end of the stator core and L2 represents a length from an axial center of the rotator core to the axial direction end, and L2 is larger than L1.

2. The permanent magnet embedded motor according to claim 1, wherein
each of the first electromagnetic steel plates and each of the second electromagnetic steel plates are provided with voids that are formed at a location between each of the magnet insertion holes and a rotor axis, and
a thin part interposed between a radially inside surface of each of the magnet insertion holes and the voids is deformed in a radially outer direction and configured to hold the magnet, a position of which is regulated by the projection, on an inner circumferential surface of each of the magnet insertion holes.

3. The permanent magnet embedded motor according to claim 1, wherein
the magnet, a position of which is regulated by the projection, is adhered on an inner circumferential surface of the magnet insertion holes.

4. A compressor comprising the permanent magnet embedded motor according to claim 1 incorporated therein.

5. A refrigeration and air conditioning device comprising the compressor according to claim 4 incorporated therein.

6. The permanent magnet embedded motor according to claim 1, wherein
a width of each of the magnet insertion holes in the radial direction is constant in the axial direction.

7. The permanent magnet embedded motor according to claim 1, wherein the magnet insertion holes of the first and second electromagnetic steel plates are axially aligned, and each of the magnets extends a length of the rotor core through the axially aligned magnet insertion holes.

8. A permanent magnet embedded motor comprising a rotor core including a plurality of electromagnetic steel plates that are stacked therein, the rotor core being provided in a stator core and comprising:
a plurality of first electromagnetic steel plates that are stacked together as a group in a common axial direction of the rotor core and the stator core, and
a plurality of second electromagnetic steel plates, wherein
each first electromagnetic steel plate of the first electromagnetic steel plates and each second electromagnetic steel plate second of the second electromagnetic steel plates contains a plurality of magnet insertion holes,
a plurality of magnets constituting magnetic poles of the rotor core, a magnet of the plurality of magnets being inserted into and through each magnetic insertion hole of the magnetic insertion holes,
each first electromagnetic plate of the first electromagnetic steel plates contains first voids provided at both circumferential ends of each magnet insertion hole of the magnet insertion holes,
each second electromagnetic plate of the second electromagnetic steel plates contains:
second voids provided at both circumferential ends of each magnet insertion hole of the second electromagnetic steel plates, projections provided at both circumferential ends of each magnet insertion hole of the second electromagnetic steel plates, each projection of the projections extending radially from an inside surface of each magnet insertion hole of the second electromagnetic steel plates and being configured to regulate a position of the magnet inserted into and through each magnet insertion hole of the second electromagnetic steel plates, and each second electromagnetic steel plate of the second electromagnetic steel plates is stacked on at least one axial end plate of the group of first electromagnetic steel plates stacked together in an axial direction, wherein L1 represents a length extending in a radial direction from the common axial center of the stator core and the rotator core to an outer circumferential end of the stator core, L2 represents a length extending in a radial direction from the common axial center of the standard core and the rotator core to an outer circumferential end of the rotator core, and L2 is larger than L1.

9. The permanent magnet embedded motor according to claim 8, wherein voids are provided at a location between a rotor axis and each magnetic insertion hole of the magnetic insertion holes, and a thin part is interposed between a radially inside surface of each magnet insertion hole of the magnetic insertion holes and a corresponding void of the voids, the thin part being configured to deform in a radially outer direction and hold the magnet on an inner circumferential surface of each magnet insertion hole of the magnetic insertion holes at the position regulated by the projection of each magnetic insertion hole.

10. The permanent magnet embedded motor according to claim 8, wherein the magnet, a position of which is regulated by the projection, is adhered on an inner circumferential surface of the magnet insertion holes.

11. A compressor comprising the permanent magnet embedded motor according to claim 8 incorporated therein.

12. A refrigeration and air conditioning device comprising the compressor according to claim 11 incorporated therein.

13. The permanent magnet embedded motor according to claim 8, wherein each magnet of the plurality of magnets has a flat plate shape and each magnet insertion hole of the magnetic insertion holes is configured to accommodate the flat plate shape of the magnets.

14. The permanent magnet embedded motor according to claim 8, wherein the magnet insertion holes of the first and second electromagnetic steel plates are axially aligned, and each of the magnets extends a length of the rotor core through the axially aligned magnet insertion holes.

* * * * *